3,147,269
PROCESS FOR THE SEPARATION OF NICOTINIC AND ISONICOTINIC ACID
Ernst Katscher and Walter Moroz, Vienna, Austria, assignors to International Chemical Corporation, New York, N.Y., a corporation of New York
No Drawing. Filed Mar. 22, 1962, Ser. No. 181,770
Claims priority, application Austria May 8, 1961
7 Claims. (Cl. 260—295)

The difficulty of separation of beta- and gamma-pyridine carboxylic acids has been for a long time the cause that picoline bases boiling within a range of 140–145° C. and consisting of a mixture of beta- and gamma-picoline and 2,6-lutidine, have not been used for the production of nicotinic and isonicotinic acid. The more expensive pure pyridine was used for the production of isonicotinic acid, by introducing the side chain with the aid of acetic anhydride. Gamma-picoline was another starting material for this purpose. It can be obtained synthetically by interaction between acetaldehyde and ammonia. Nicotinic acid was mainly obtained by the oxidation of quinoline or the synthetically obtainable 2,5-methylethylpyridine. Only recently, the oxidation of mixtures of beta- and gamma-picoline—with or without 2,6-lutidine—was taken into consideration. Such picoline mixtures having a boiling range of 140–145° C. contain these three bases. If a mixture of beta- and gamma-picoline is oxidized under mild conditions, the bulk of gamma picoline will be converted into isonicotinic acid, while the rest of the bases remains unchanged. Nicotinic acid and isonicotinic acid could be separated from each other e.g. by processes based on the change of proportion of solubility of said acids in water at different temperatures, or on the different solubility of these acids in water and their calcium salts in diluted alcohol, fractional precipitation of these salts at different pH values. According to another suggestion, the difference in the velocity of crystallization and dissolution of nicotinic and isonicotinic acid has been used for the separation of both acids. These suggestions did not give the desired results. Others have been quite successful but called for additional reactions, equipment, process steps etc. and were, therefore, too complicated and expensive.

It has now been surprisingly found that the proportion of the solubility of some water-soluble salts, as the sodium, ammonium, calcium salts, of nicotinic and isonicotinic acid in water, relative to each other, is considerably different from the proportion of the solubility of the free acids in water, relative to each other and that this difference can be utilized for the separation of these acids in a simple and satisfactory manner. The following tables illustrate said difference by stating the solubilities of the free acids and their said salts. The influence of the presence of sodium sulfate on the respective solubilities was taken into account in these investigations, because sodium sulfate is formed when picoline bases are oxidized by sulfuric acid in the presence of a catalyst and the acid is afterwards converted into its sodium salt, or when sulfuric acid is used for the liberation of nicotinic and isonicotinic acid from the sodium salts.

TABLE 1

Solubility of Nicotinic and Isonicotinic Acid in Water

| Temperature, ° C. | 100 grams saturated aqueous solution contains— | | | |
|---|---|---|---|---|
| | Nicotinic acid alone, grams | Isonicotinic acid alone, grams | Mixture of— | |
| | | | Nicotinic acid, grams | Isonicotinic acid, grams |
| 0 | 0.86 | | 1.0 | 0.3 |
| 15 | 1.3 | 0.45 | | |
| 22 | 1.66 | | | |
| 25 | | 0.59 | | |
| 30 | 1.94 | 0.79 | | |
| 38 | 2.47 | | | |
| 40 | | | 2.5 | 0.9 |
| 61 | 4.6 | | | |
| 78 | 6.0 | | | |
| 80 | | | 7.4 | 2.2 |
| 100 | 9.76 | 3.52 | 10.9 | 3.0 |

TABLE 2

Solubility of Nicotinic Acid in Saturated Aqueous Sodium Sulfate Solution

| Temperature, ° C. | 100 g. solution contains— | | |
|---|---|---|---|
| | Sodium sulfate, g. | Nicotinic acid, g. | Water, g. |
| 22 | 18.2 | 1.25 | 80.55 |
| 40 | 31.9 | 0.67 | 67.4 |

TABLE 3

Solubility of Picolinic Acid in 100 g Aqueous Solution

Temperature, ° C.:                 Picolinic acid in g.
   19 ------------------------------------------- 35.1
   60 ------------------------------------------- 58.7
   88 ------------------------------------------- 77.4
  108 ------------------------------------------- 88.3

TABLE 4

Solubility of Sodium Nicotinate in Saturated Aqueous Sodium Sulfate Solution

| Temperature, ° C. | 100 g. solution contains— | | |
|---|---|---|---|
| | Sodium sulfate, g. | Sodium nicotinate, g. | Water, g. |
| 10 | 2.1 | 21.8 | 76.1 |
| 40 | 1.0 | 48.5 | 50.5 |

TABLE 5

Solubilities of Mixed Salts

[Sodium nicotinate, sodium isonicotinate and sodium sulfate in 100 g aqueous solution]

| Temperature, ° C. | 10 | 15 | 25 |
|---|---|---|---|
| Components: | | | |
| Sodium nicotinate, grams | 16.9 | 18.1 | 22.6 |
| Sodium isonicotinate, grams | 16.2 | 18.0 | 18.6 |
| Sodium sulfate, grams | 0.9 | 1.3 | 2.3 |

TABLE 6

*Solubility of Sodium, Ammonium, Calcium Nicotinate and Isonicotinate in Aqueous Solution*

| Temperature, °C. | 100 g. solution of a single salt contains— | | | | | | | |
|---|---|---|---|---|---|---|---|---|
| | (a) | (b) | (c) | (d) | (e) | (f) | (g) | (h) |
| | G. | G. | G. | G. | G. | G. | G. | G. |
| 11 | 23.3 | 40.2 | | | 25.4 | 60.4 | | |
| 20 | 30.0 | 43.6 | 1.9 | 10.0 | 31.0 | 63.5 | 5.9 | 15.3 |
| 30 | 37.4 | 48.0 | | | 37.9 | 66.4 | | |
| 40 | 48.5 | 53.1 | | | 44.0 | 70.0 | | |
| 100 | | | 4.1 | | | | 31.3 | |

(a) = Sodium nicotinate.
(b) = Ammonium nicotinate.
(c) = Calcium nicotinate.
(d) = Magnesium nicotinate.
(e) = Sodium isonicotinate.
(f) = Ammonium isonicotinate.
(g) = Calcium isonicotinate.
(h) = Magnesium isonicotinate.

TABLE 7

*Solubility of Sodium, Ammonium, Calcium Nicotinate and Isonicotinate in Aqueous Solution*

| Temperature, °C. | 100 g. solution of mixed salts contains— | | | | | |
|---|---|---|---|---|---|---|
| | (a) + (b) | | (c) + (d) | | (e) + (f) | |
| | G. | G. | G. | G. | G. | G. |
| 12 | 17.1 | 18.5 | 17.5 | 50.0 | | |
| 20 | 20.9 | 20.1 | 20.6 | 50.4 | 1.95 | 6.2 |
| 30 | 27.4 | 22.4 | 24.0 | 48.6 | | |
| 40 | 29.2 | 27.0 | 26.7 | 47.6 | | |
| 100 | | | | | 7.0 | 31.7 |

(a) = Sodium nicotinate.
(b) = Sodium isonicotinate.
(c) = Ammonium nicotinate.
(d) = Ammonium isonicotinate.
(e) = Calcium nicotinate.
(f) = Calcium isonicotinate.

It has been found that the different proportions of the solubilities of nicotinic acid and isonicotinic acid in water to each other and the different proportions of the solubilities of the said water-soluble salts of nicotinic acid and isonicotinic acid in water to each other can be utilized with advantage for the separation of these acids from each other by proceeding in the manner described hereinafter.

The starting material in carrying out the present invention may be a mixture of nicotinic acid with isonicotinic acid or a mixture of the said salts with these acids.

The use of the different cations for separation of the two acids has different advantages. An average solubility of about 15 to 30% seems to be very useful, because the quantity of solution is kept low and separation of the precipitated crystals from the mother liquor can be carried out without difficulties. This is the main advantage of sodium salts. The solubility of the ammonium salts is much higher and working with these salts presents some difficulties. On the other hand, the change of the relative solubilities of these salts compared with the solubilities of their acids, is considerably increased. This is the advantage of the ammonium salts. The calcium salts show the valuable advantage that the free acids liberated from them by sulfuric acid, contain in solution only minute amounts of alien salts (calcium sulfate), due to the low solubility of calcium sulfate.

(a) For example, a solid mixture of nicotinic acid and isonicotinic acid is treated with such an amount of water that the total amount of one of the acids is completely dissolved, while a part of the other acid remains undissolved. Or an aqueous solution containing a mixture of water-soluble salts of nicotinic acid and isonicotinic acid is acidified for liberation of both acids, thereby having such an amount of water in the solution that the total amount of one of the liberated acids remains in solution, while part of the other liberated acid is precipitated. In both cases, the undissolved acid—which is free, or almost free, from the other isomer—is mechanically separated from the solution. The separated solution, which contains both acids in solution, is neutralized, for instance, with sodium hydroxide, or ammonia, or calcium carbonate, or the like. If calcium salts are prepared the precipitated calcium nicotinate can be separated mechanically. The remaining solutions can be treated like the solution resulting after neutralization with sodium—or ammonium carbonate, bicarbonate, or hydroxide or the like. They are concentrated with seeding and under stirring to such an extent that one of the salts separates from the solution by crystallization, while the total amount of the other salt remains dissolved. It is advisable to concentrate the solution until that salt, the total amount of which remains dissolved, forms a saturated or nearly saturated solution. The crystallized salt is mechanically separated from the solution and, if desired, washed in order to remove the mother liquor. It may then be recrystallized, treated with a mineral acid in order to liberate the free acid, separated from its isomer. The mother liquor which contains a water-soluble nicotinate and isonicotinate in the proportion corresponding to the solubility of these salts is now treated with a mineral acid in order to convert the salts into free nicotinic and isonicotinic acid and so much water is added that the total amount of nicotinic acid remains dissolved while the isonicotinic acid remains partly undissolved and the undissolved part is then mechanically separated. In this way the nicotinic acid and isonicotinic acid of the starting mixture can be completely separated from each other.

(b) In carrying out the invention, the cycle of separating steps can be started also with a mixture of the water-soluble salts of nicotinic and isonicotinic acid.

For the purpose of separating these acids from each other it does not matter whether one or the other acid is present in excess or whether both acids are present in about equal quantities.

If the proportion of nicotinic acid to isonicotinic acid in their mixture is about 3:1, it is necessary to start separation of the acids from the side of the salts. If the proportion is about 1:1, the first step of separation should be started from the side of the acids, in case the sodium salts of the acids are used for the process of separation. If the proportion of nicotinic to isonicotinic acid is different from either proportion (3:1 and 1:1), both kinds of starts for the separation of the two acids from each other, can be used. If a solution contains also a mineral acid, e.g. sulfuric acid, which may form onium salts of nicotinic and isonicotinic acid, a suitable amount of a base, e.g. soda, ammonia and the like, should be added, in order to liberate the organic acids. If the isomeric pyridine carboxylic acids are present in a solution in the form of salts, e.g. sodium salts, it is necessary to add a mineral acid, e.g. sulfuric acid, to liberate the nicotinic and isonicotinic acid. If an acid mixture obtained by oxidation of a picoline mixture—having a boiling range of 140–145° C.—contains in addition to nicotinic and isonicotinic acid, also picolinic acid, the bulk of the beta- and gamma-pyridine carboxylic acids can be separated from the rest of the acids by utilizing the considerably greater solubility of the picolinic acid and possibly the ease of its sublimitation, or other means known from the art.

According to an advantageous embodiment of the invention, a mixture of nicotinic and isonicotinic acid is treated in a first step with so much water and at such temperature that all of the nicotinic acid is dissolved while a considerable part of the isonicotinic acid remains undissolved in practically pure condition and can then be separated from the solution. The acidic solution is now neutralized with sodium hydroxide, ammonia or the like. If calcium salts are formed from the nicotinic and isonicotinic acids in solution, a part of calcium nicotinate will be immediately precipitated when the dilution is chosen in such a way that the calcium isonicotinate remains completely in solution. If the neutralization is carried out with soda, ammonia or the like, the neutralized solution is concentrated by evaporation until the concentration of isonicotinate attains, or almost attains, saturation concentration at the temperature used. Under these conditions—either spontaneously or after seeding and stirring—a considerable part of the nicotinate crystallizes until the solution is no longer oversaturated with this salt. The crystals of nicotinate are mechanically separated, washed and—if necessary—recrystallized in order to obtain the nicotinic acid free of any isomer upon liberating and recovering the free acid subsequently. The mother liquor can be acidified again in order to liberate the acids and to the acidified solution water is then added in order to bring all of the nicotinic acid into solution. Under these conditions another crop of isonicotinic acid remains undissolved and can be mechanically separated. This step can be combined with the first step of separation described about under (a).

The following examples describe some specific embodiments of the invention to which the invention is not limited.

EXAMPLE 1

A mixture of 600 g. isonicotinic acid and 400 g. nicotinic acid is treated with 5000 ml. of water at a temperature of 80–90° C. under stirring for one hour. The undissolved material is separated by filtration, washed a few times with small portions of hot water of 50–60° C., and dried at about 105° C. The dried crystalline material consists of about 470 g. of isonicotinic acid, free of nicotinic acid. Mother and wash liquors are combined, the combined solution is neutralized, with sodium hydroxide (about 175 g.) to a pH of 8 and concentrated by evaporation to about 1560 g. Even after cooling to about 15° C., the solution will not be quite saturated in sodium isonicotinate, while it will be strongly oversaturated in sodium nicotinate under these conditions. If spontaneous crystallization does not occur, the solution is seeded with sodium nicotinate crystallized from water, after cooling to about 20° C., and then allowed to stand quietly, or it is stirred slowly for two hours in order that the crystallization of this salt be complete, corresponding to the conditions used. The crystallized sodium nicotinate is separated by filtration and the mother liquor is cooled further to about 10° C. in order to obtain a second crop of sodium nicotinate. The temperature may be brought directly to 10° C., in order to save one filtration. Altogether, 830 g. of wet crystals are received, which contain about 350 g. of dry sodium nicotinate and 30 g. of sodium isonicotinate, a quantity corresponding roughly to the content of sodium isonicotinate in the mother liquor adhering to the crystals. The bulk of the water attached to the crystallized sodium nicotinate is water of crystallization.

It is advantageous to recrystallize the sodium nicotinate from water in order to get a salt with a further strongly reduced content of sodium isonicotinate, which yields pure nicotinic acid by liberation with a mineral acid (melting point 234–236° C.).

The mother and wash liquor, combined after the separation of sodium nicotinate, still contains about 120 g. of each of the salts. After adding 600 g. of water and 32 g. of concentrated sulfuric acid in order to lower the pH of the solution to a pH of 3.6 and heating the mixture to about 90° C., the undissolved isonicotinic acid is separated by filtration. It is washed with a few small portions of water and dried. Yield: approx. 70 g.

Mother and wash liquors contain still about 30 g. of isonicotinic acid and 103 g. of nicotinic acid. It is quite possible to repeat the above described cycle of steps consisting of neutralizing the solution, concentrating it, filtering off sodium nicotinate, etc. On the other hand, it is more advantageous to add the mother and wash liquors to the mother and wash liquors of the first step of the next batch after separation of the first crop of isonicotinic acid.

EXAMPLE 2

A mixture of 700 g. of isonicotinic acid and 300 g. of nicotinic acid is dissolved in a solution of 325 grams of sodium hydroxide in 910 g. of water at an elevated temperature (60–80° C.) while stirring. The resulting solution is cooled to about 20–30° C. and stirring continued. If no spontaneous crystallization takes place, some crystallized sodium isonicotinate is added in order to start crystallization by seeding. Cooling should be continued to a temperature of about 15° C. In order to get large crystals, it may be suitable to stop stirring or to continue stirring slowly, and to keep the mixture at this temperature for about one hour, until crystallization of the sodium isonicotinate is terminated. Cooling has to be continued during the whole process, because heat is produced by crystallization of the salt. The salt is separated by filtration, washed with a few portions of ice cold water. About 800 g. of wet sodium isonicotinate is thus obtained, containing 370 g. of pure isonicotinic acid. Mother and wash liquors can be treated in the way outlined in Example 1. Nicotinic and isonicotinic acid can be liberated by adding a mineral acid until the pH is adjusted to 3.6 and so much water should be added at the temperature reached, e.g. 70° C., that all the nicotinic acid will be dissolved, while a considerable part of the isonicotinic acid is precipitated. These crystals of isonicotinic acid are separated, the mother liquor is again neutralized, concentrated, another crop of sodium isonicotinate is allowed to crystallize, and further treated as described above.

EXAMPLE 3

A mixture consisting of 700 g. nicotinic acid and 300 g. isonicotinic acid is suspended in 5300 ml. water while stirring and heating to about 80–90° C., when 410 g. of calcium carbonate is added in small portions. Afterwards, a small quantity of calcium hydroxide (about 5–10 g.) is added in order to bring the pH of the mixture to 7–8. During the process of neutralization, a considerable quantity of water is carried away by the developed carbon dioxide and should be substituted by additional water. The mixture is cooled to about 20° C. and allowed to rest for a few hours in order that the crystallization of calcium nicotinate is completed. The precipitate is filtered, washed with water and again suspended in approximately 7000 ml. of hot water, when a 2n–10n sulfuric acid is added in such a quantity that the pH of the resulting solution is brought to 3.3. The mixture is heated to approximately the boiling point and the calcium sulfate formed is filtered and washed. The filtrate is allowed to crystallize by cooling to about 10–20° C. The precipitated nicotinic acid is filtered, washed a little, and dried. 480 g. of pure nicotinic acid, melting point 235–236° C., are collected. The mother liquor still contains 100–120 g. nicotinic acid, which can be recovered by concentration.

The mother liquor—after the crystallization of the calcium nicotinate—is concentrated by evaporation to approximately 4000 ml. and cooled to room temperature. Hydrochloric acid is added until the pH is brought to 3.3. The resulting solution is allowed to crystallize at about 15° C. during approximately 2 hours. The crystallized isonicotinic acid is filtered, washed with water until it is free of chlor ions, and dried. The collected pure isonicotinic acid weighs 260 g., melting point 314–317° C.

Mother and wash liquors together contain still about 140 g. of a mixture of nicotinic and isonicotinic acid in almost the same proportion as the starting mixture. This mixture of both acids can be collected after concentrating the solution to a small volume and crystallization. The separation of the acids from this part of the mixture can be carried out in the way already described, but it seems to be advisable to add it to a next big batch in order to carry out the separation of this and the remaining mixture together.

The separation of nicotinic and isonicotinic acid according to the process of this invention is highly economical and very simple so that it can be carried out easily and represents a useful, considerable progress in comparison with the processes known from the art.

The solubilities stated in the above tables were determined in conventional manner, i.e. saturating water with an excess of the respective substance and at the respective temperature; separating the undissolved solids, e.g. by filtration, and determining the amount of dissolved substances in conventional manner. The term sodium sulfate is used herein to denote the anhydrous salt, $Na_2SO_4$. The term "solubility" refers to the weight of the acids and salts present in the saturated solution in 100 parts by weight of such solution. In addition to the salts of sodium, calcium and ammonium already mentioned above, water-soluble salts of other metals, such as magnesium, can also be used, but in general the use of sodium and calcium salts is preferred. The preferred acid for acidification of the salt solutions is sulfuric acid, but other acids such as hydrochloric acid, nitric acid and phosphoric acid can also be used.

What is claimed is:

1. A process for the separation of nicotinic acid and isonicotinic acid in aqueous solution, comprising neutralizing said solution and converting both acids into their water-soluble salts selected from the group consisting of calcium salts and sodium salts, using thereby concentrations at which the isonicotinate formed remains in solution, while part of the nicotinate formed is precipitated from the neutralized solution and is mechanically separated from the solution.

2. A process as claimed in claim 1, in which the nicotinic and isonicotinic acid are converted by neutralization into calcium salts.

3. A process as claimed in claim 1, in which the nicotinic and isonicotinic acid are converted by neutralization into sodium salts.

4. A process as claimed in claim 1, in which nicotinate dissolved in the neutralized solution is recovered from the latter by concentration of said solution, crystallization, and mechanical separation of the crystals from the solution.

5. A process for the separation of nicotinic acid from isonicotinic acid, comprising dissolving a mixture of nicotinic acid and isonicotinic acid in an aqueous alkaline soluton forming under heating water-soluble salts with said acids; cooling the resulting solution in order to yield crystals of the nicotinic acid salt formed and mechanically separating these crystals from the solution; acidifying and diluting with water the solution separated from said crystals to such extent that it contains sufficient water for dissolving all nicotinic acid freed by acidification, but does not contain sufficient water to dissolve all isonicotinic acid freed by acidification, so that part of the free isonicotinic acid is undissolved, and mechanically separating the undissolved isonicotinic acid from the solution, the alkali in said aqueous alkaline solution being selected from the group consisting of calcium carbonate, calcium hydroxide, sodium hydroxide, sodium carbonate and sodium bicarbonate.

6. A process for the separation of nicotinic from isonicotinic acid, as claimed in claim 1, by repeating the individual operations in order to complete separation of the acids.

7. A process according to claim 1, in which the compound used for neutralization of the nicotinic and isonicotinic acid is selected from the group consisting of calcium carbonate, calcium hydroxide, sodium hydroxide, sodium carbonate and sodium bicarbonate.

References Cited in the file of this patent

Swietoslawski et al.: Roczniki Chem., vol. 26, pp. 443–52 (1952), abstracted in "Chemical Abstracts," vol. 48, p. 9271h.